United States Patent
Woerner et al.

(10) Patent No.: US 6,510,527 B1
(45) Date of Patent: Jan. 21, 2003

(54) METHOD AND SYSTEM FOR DATA PROTECTION

(75) Inventors: Dieter Woerner, Eppingen (DE); Thomas Purat, Asperg (DE); Friedhelm Broeckel, Wendlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/298,656

(22) Filed: Apr. 23, 1999

(30) Foreign Application Priority Data

Apr. 23, 1998 (DE) .......................... 198 18 175

(51) Int. Cl.$^7$ ................................ H02H 3/05
(52) U.S. Cl. ........................... 714/5; 714/722
(58) Field of Search .................. 714/5, 6, 11, 29, 714/42, 722; 711/103

(56) References Cited

U.S. PATENT DOCUMENTS

| | | | |
|---|---|---|---|
| 4,698,808 A | 10/1987 | Ishii | |
| 5,146,459 A | * 9/1992 | Shimizu | ............ 714/722 |
| 5,181,206 A | * 1/1993 | Hashiguchi | ............ 714/722 |
| 5,682,394 A | * 10/1997 | Blake et al. | ............ 714/763 |
| 5,701,316 A | * 12/1997 | Alferness et al. | ........ 714/807 |
| 5,914,971 A | * 6/1999 | Carter et al. | ............ 714/822 |

FOREIGN PATENT DOCUMENTS

| | | | |
|---|---|---|---|
| FR | 2 371 734 | 6/1978 | |
| GB | 1552086 | 9/1979 | |
| GB | 2030334 | * 4/1980 | ......... G06F/11/30 |

* cited by examiner

*Primary Examiner*—Dieu-Minh Le
(74) *Attorney, Agent, or Firm*—Kenyon & Kenyon

(57) ABSTRACT

A method and a system for data protection of fixed and learned control data of duplicated, program-controlled computers, in which the control parameters are stored in an EEPROM. The memory available in the EEPROM is divided into three areas. Each area is monitored using a check sum (check sum 1, check sum 2, check sum 3) that is stored therein. Only the self-learned variables are maintained redundantly. Thus, the ability to store more data than previously in the EEPROM with the same data protection and the same accessibility is provided, thus allowing more flexible solutions with respect to varying customer requirements to be offered.

6 Claims, 3 Drawing Sheets

| | Cell | Content | Type | Controller |
|---|---|---|---|---|
| A | 1 | Datum 1 | fixed Parameter | μC 1, μC 2 (1, 2) |
| | 2 | Datum 2 | fixed Parameter | |
| | 3 | Datum 3 | fixed Parameter | |
| | . | . | . | |
| | . | . | . | |
| | . | . | . | |
| | x–1 | Check sum 1 [Cell (1) through Cell (x–1)] | fixed Parameter | |
| B | x | Datum x | self-learned variable | μC 1 (1) |
| | x+1 | Datum x+1 | self-learned variable | |
| | x+2 | Datum x+2 | self-learned variable | |
| | . | . | . | |
| | . | . | . | |
| | . | . | . | |
| | y–1 | Check sum 2 [Cell (x) through Cell (y–1)] | self-learned variable | |
| C | y | Datum x | self-learned variable | μC 2 (2) |
| | y+1 | Datum x+1 | self-learned variable | |
| | y+2 | Datum x+2 | self-learned variable | |
| | . | . | . | |
| | . | . | . | |
| | . | . | . | |
| | 256 | Check sum 3 [Cell (y) through Cell (256)] | self-learned variable | |

| Cell | Content | Type | Controller |
|------|---------|------|------------|
| 1 | Datum 1 | fixed Parameter | |
| 2 | Complement 1 | fixed Parameter | |
| 3 | Datum 2 | fixed Parameter | |
| 4 | Complement 2 | fixed Parameter | μC 1 |
| . | . | . | |
| . | . | . | (1) |
| . | . | . | |
| 125 | Datum 63 | self-learned variable | |
| 126 | Complement 63 | self-learned variable | |
| 127 | Datum 64 | self-learned variable | |
| 128 | Complement 64 | self-learned variable | |
| 129 | Datum 1 | fixed Parameter | |
| 130 | Complement 1 | fixed Parameter | |
| 131 | Datum 2 | fixed Parameter | |
| 132 | Complement 2 | fixed Parameter | μC 2 |
| . | . | . | |
| . | . | . | (2) |
| . | . | . | |
| 253 | Datum 63 | self-learned variable | |
| 254 | Complement 63 | self-learned variable | |
| 255 | Datum 64 | self-learned variable | |
| 256 | Complement 64 | self-learned variable | |

FIG. 2

| Cell | Content | Type | Controller |
|---|---|---|---|
| 1 | Datum 1 | fixed Parameter | |
| 2 | Datum 2 | fixed Parameter | |
| 3 | Datum 3 | fixed Parameter | |
| . | . | . | µC 1, µC 2 |
| . | . | . | |
| . | . | . | (1, 2) |
| x−1 | Check sum 1 [Cell (1) through Cell (x−1)] | fixed Parameter | |
| x | Datum x | self-learned variable | |
| x+1 | Datum x+1 | self-learned variable | |
| x+2 | Datum x+2 | self-learned variable | |
| . | . | . | µC 1 |
| . | . | . | |
| . | . | . | (1) |
| y−1 | Check sum 2 [Cell (x) through Cell (y−1)] | self-learned variable | |
| y | Datum x | self-learned variable | |
| y+1 | Datum x+1 | self-learned variable | |
| y+2 | Datum x+2 | self-learned variable | |
| . | . | . | µC 2 |
| . | . | . | |
| . | . | . | (2) |
| 256 | Check sum 3 [Cell (y) through Cell (256)] | self-learned variable | |

Rows A: cells 1 through x−1; Rows B: cells x through y−1; Rows C: cells y through 256. Table labeled 3'.

METHOD AND SYSTEM FOR DATA PROTECTION

FIELD OF THE INVENTION

The present invention relates to a method for data protection of fixed and learned control parameters of duplicated, program-controlled computers, in which the parameters are stored in an EEPROM. The parameter storage area in the EEPROM is available for storing the control parameters and associated test data and is subdivided into at least two discrete subareas, which are assigned, respectively, to the one and to the other computer.

BACKGROUND INFORMATION

FIG. 1 shows a control system known in the related art, which functions, for example, to control an engine of a motor vehicle and for this purpose contains two redundantly arranged microcontrollers 1 and 2 ($\mu$C1, $\mu$C2). An electrically programmable and erasable read-only memory 3, assigned to both microcontrollers or computers 1 and 2 and abbreviated EEPROM, in its area assigned for data whose parameters have been fixedly set and for learned (self-learning) variables, is divided into two areas I and II, in a ratio of 1:1, each assigned to one of the microcontrollers 1 and 2. For each microcontroller 1 and 2, the same information is in principle stored in each of the storage areas I and II of EEPROM memory 3. In this context, in the related art all data are additionally stored along with a complement of themselves.

This data storage in electrically erasable and programmable EEPROMs is used to flexibly manipulate control units and to program into the control unit the most varied parameters for various customer requirements in the final stage of production during the final testing or even at the place of installation. In this way, changes in the software and in customer-dependent software versions are minimized.

For this reason, it is a goal to store in one EEPROM the greatest possible amount of data with the greatest possible security and accessibility.

FIG. 2 depicts in detail a data organization in an EEPROM 3 of this type, that is customary in the related art.

In a first subarea assigned to first microcontroller 1, there are stored, for example, in cells 1–128 the fixed parameters assigned to this microcontroller 1 and the learned variables of this microcontroller 1 (self-learned variables) as datum 1 through datum 64 together with their respective complements 1–64, in cascade, in cells 1–128.

In a second subarea II, assigned to second microcontroller 2, there are stored the fixed parameters assigned to this second microcontroller 2 and the variables learned from it (self-learned variables), respectively, as datum 1 through datum 64 together with their respective complements 1–64, in cascade, in cells 129–256.

In this way, the effectively usable size of the entire EEPROM area is reduced to a fourth of its overall size.

For assuring the consistency of the important control unit parameters in EEPROM 3, the following monitoring and corrective steps are provided in the related art. According to a first step, complement storage for all data is provided. If the complement does not match the datum, then the EEPROM is declared defective if it is a question of a fixed parameter, and the datum is declared implausible if it is a question of a self-learned variable. A data correction is perhaps possible on the basis of data redundancy. According to a second step, a monitoring of permissible values for self-learned variables is performed. If the datum exceeds the relevant permissible limit value, it is declared implausible. A data correction is perhaps possible on the basis of data redundancy. According to a third step, redundant data storage in the two separated storage areas I and II is provided, in order to correct the implausible data discovered in the previous two steps. In this context, the following corrective steps are carried out. If the datum and the complement are correct and identical in both microcontrollers 1 and 2, then the data are valid. If the data and its complement are correct but different in both microcontrollers 1 and 2, then the datum and its complement from microcontroller 2 are programmed using the datum and its complement from microcontroller 1, and thus complete redundancy is reestablished. If the datum or its complement from microcontroller 1 are implausible, then the datum and its complement from microcontroller 1 are programmed using the datum and its complement from microcontroller 2 and thus complete redundancy is reestablished. If the data or complements from both microcontrollers are implausible, then the default values are accepted and the EEPROM is declared defective.

SUMMARY OF THE INVENTION

It is an objective of the present invention to store as many parameters as possible in an electrically erasable and programmable memory EEPROM, that is used in common by two redundantly arranged microcontrollers and computers of a control system, without, in this context, dispensing with the assurance of the data consistency in the event of errors.

The above-mentioned objective is achieved in a method according to the present invention, in that provision is made for a step for memory management, by subdividing the parameter storage area in the EEPROM into three discrete subareas. A first subarea functions to store common, fixed parameters accessible to both computers, without their complements, and additionally a running digital sum (check sum) for all fixed parameters. A second subarea, which is accessible to only one of the two computers, functions to store learned (self-learned) variables of this computer, without their complements, and a check sum for all these learned variables. A third subarea, which is accessible only to the other of the two computers, functions to store learned (self-learned) variables of this computer, without their complements, and a check sum for all these learned variables.

According to the method of the present invention, the memory available in the EEPROM is divided into three areas. Each memory area is monitored using a check sum. Only the self-learned variables are maintained redundantly. Thus the method according to the present invention makes it possible to store more data than before in the EEPROM, with the same data security and the same accessibility, and thus offers more flexible solutions with respect to various customer requirements.

The above objective, in addition, is achieved according to the present invention by a system for carrying out the method, the system being characterized in that in each of the two computers provision is made for a memory management means, which subdivides the parameter storage area in the EEPROM into three discrete subareas. According to this arrangement, each subarea plays a certain role. A first subarea is assigned in common to the two computer and functions to store fixed parameters in common to both computers, without their complements, and a check sum for all fixed parameters. A second subarea is assigned to only one of the computers and functions to store learned variables of this computer, without their complements, and a check sum of all these learned variables. A third subarea is assigned only to the other of the two computers and functions to store learned variables of the other computer, without their complements, and a check sum of all these learned variables.

BRIEF DESCRIPTION OF THE DRAWINGS

FIG. 2 shows a data organization of an EEPROM used in the control system of FIG. 1.

FIG. 3 shows an exemplary embodiment of the storage organization of an EEPROM memory organized in accordance with the present invention.

DETAILED DESCRIPTION

Figure 1:
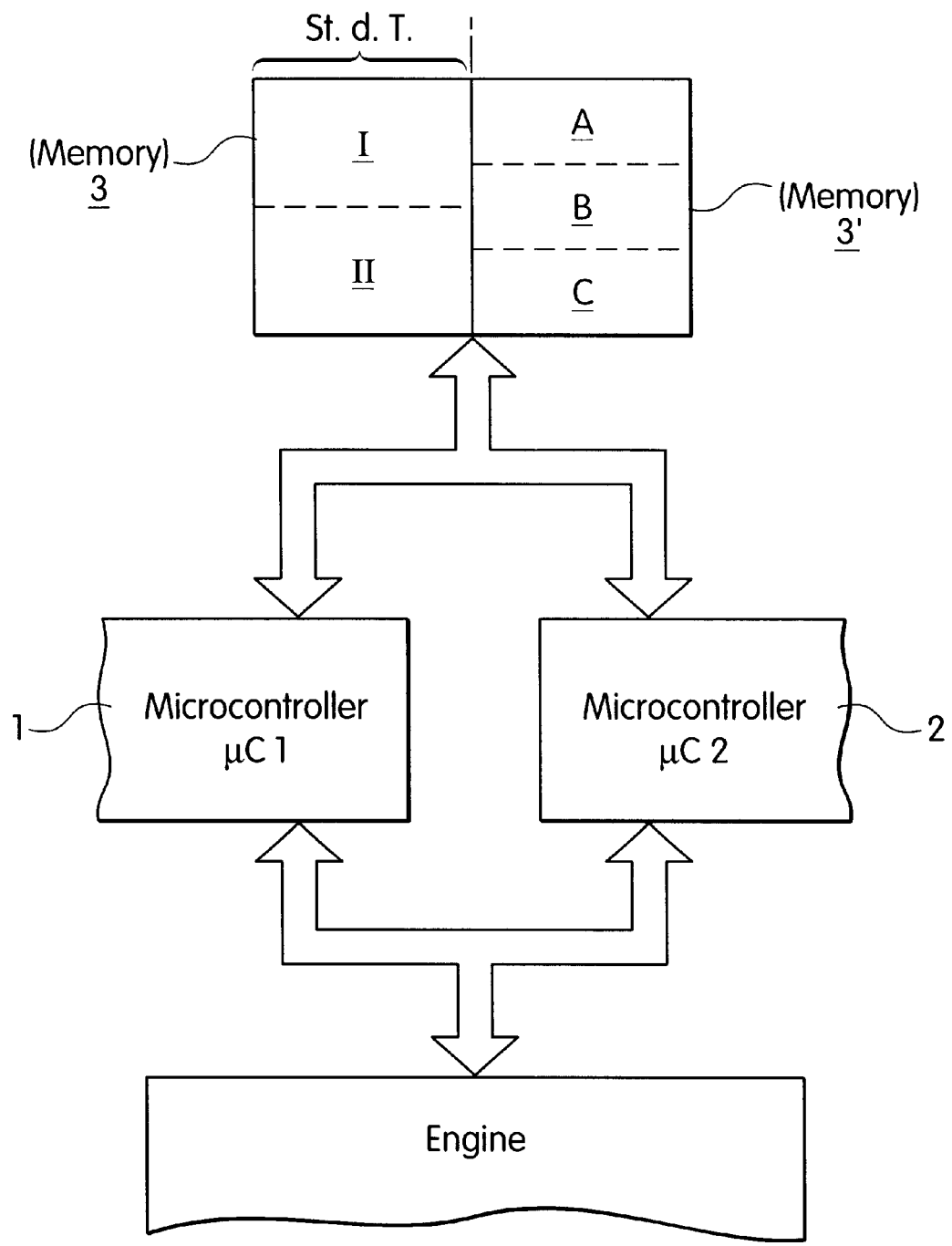
FIG. 1 shows a system diagram of a control system of the related art.

FIG. 3 shows that the memory available in an EEPROM 3' is subdivided into three discrete subareas A, B, and C. Area A contains fixed parameters, without their complements, and a check sum for this area. This area A is accessible to both microcontrollers ($\mu$C1, $\mu$C2) 1,2. In second subarea B, self-learned variables, without their complements, and a check sum of this area are stored; this area is accessible only to first microcontroller ($\mu$C1) 1. In subarea C are stored self-learned variables, without their complements, and a check sum for this area; this area C is accessible only to the second microcontroller 1 ($\mu$C2).

The effectively usable size of the entire EEPROM area is thus at least one half of the total size, i.e., if only redundantly stored, self-learned variables are in question, and the size grows with the number of fixed parameters which are not stored in duplicate.

Below, on the basis of FIG. 3, a method for data monitoring and correction is described that is carried out in the present invention.

Specifically, on the basis of the data structure in the EEPROM that is described above and depicted in FIG. 3, the following monitoring and correction steps are carried out:

First, the storage of the check sum for each of the three storage areas A, B, and C is performed. If the check sum does not match the stored data, the EEPROM is declared defective, if it is a question of area A for the fixed parameters, and the datum is declared implausible if it is a question of one of the areas B, C for self-learned variables. Then data correction on the basis of data redundancy is perhaps possible.

Second, monitoring of permissible values for self-learned variables is performed. If the datum exceeds the permissible limit values, it is judged implausible. A data correction is perhaps possible on the basis of data redundancy.

Third, redundant data storage in the two discrete storage areas B and C for the self-learned variables is carried out in order to correct implausible data discovered in the previous two steps. In this redundant data storage, the following correction steps are carried out. First, if the datum and check sum in both microcontrollers 1 and 2 are correct and identical, then the data are valid. Second, if the datum and check sum in both microcontrollers 1 and 2 are correct but different, then the datum and check sum for microcontroller 2 are programmed using datum and check sum from microcontroller 1, and thus complete redundancy is reestablished. Third, if the datum and check sum from microcontroller 1 are implausible, the datum and check sum from microcontroller 1 are programmed using datum and check sum from microcontroller 2, and thus complete redundancy is reestablished. Fourth, if the datum and check sum from microcontroller 2 are implausible, the datum and check sum from microcontroller 2 are programmed using datum and check sum from microcontroller 1, and thus complete redundancy is reestablished. Fifth, if the data or check sums from both microcontrollers 1 and 2 are implausible, then the default values are accepted and the EEPROM is declared defective.

According to the method of the related art, as demonstrated by FIGS. 1 and 2, the memory available in the EEPROM is divided into two areas I and II, correlated with the two redundant microcontrollers 1 and 2. In each storage area I and II, the identical data, i.e., the fixed parameters and the self-learned variables, are redundantly stored and, in each case, with its complement.

According to the method of the present invention, the available memory in EEPROM 3' is divided into three areas A, B, and C. Each area is monitored using a check sum. Only the self-learned variables are maintained redundantly. Therefore, the method according to the present invention offers the possibility of storing more data than before in the EEPROM, while maintaining the same data security and the same accessibility, thus offering more flexible solutions in view of various customer requirements.

What is claimed is:

1. A method for providing data protection to a plurality of fixed control parameters and a plurality of learned variables of at least a first program-controlled computer and a second program-controlled computer, comprising the steps of:

subdividing a parameter storage area of an EEPROM into three discrete subareas;

assigning one of the three discrete subareas to the first program-controlled computer;

assigning another one of the three discrete subareas to the second program-controlled computer; and storing the plurality of fixed control parameters and the plurality of learned variables in the parameter storage area by performing the steps of:

storing in a first discrete subarea of the three discrete subareas each one of the plurality of fixed control parameters accessible to both the first program-controlled computer and the second program-controlled computer, without storing complements of the plurality of fixed control parameters stored in the first discrete subarea, storing in the first discrete subarea a check sum for the plurality of fixed control parameters stored in the first discrete subarea, storing in a second discrete subarea of the three discrete subareas accessible only to the first program-controlled computer each one of the plurality of learned variables corresponding to the first program-controlled computer, without storing complements of the plurality of learned variables stored in the second discrete subarea, storing in the second discrete subarea a check sum for the plurality of learned variables stored in the second discrete subarea, storing in a third discrete subarea of the three discrete subareas accessible only to the second program-controlled computer each one of the plurality of learned variables corresponding to the second program-controlled computer, without storing complements of the plurality of learned variables stored in the third discrete subarea, and storing in the third discrete subarea a check sum for the plurality of learned variables stored in the third discrete subarea.

2. The method according to claim 1, further comprising the steps of:

calculating a new check sum for the plurality of fixed control parameters stored in the first discrete subarea;

calculating a new check sum for the plurality of learned variables stored in the second discrete subarea;

calculating a new check sum for the plurality of learned variables stored in the third discrete subarea;

comparing the new check sum calculated for the first discrete subarea to the stored check sum for the first discrete subarea;

designating the EEPROM as defective if the new check sum calculated for the first discrete subarea is different from the stored check sum for the first discrete subarea;

comparing the new check sum calculated for the second discrete subarea to the stored check sum for the second discrete subarea;

designating the plurality of learned variables stored in the second discrete subarea as implausible if the new check sum calculated for the second discrete subarea is different from the stored check sum for the second discrete subarea;

comparing the new check sum calculated for the third discrete subarea to the stored check sum for the third discrete subarea; and designating the plurality of learned variables stored in the third discrete subarea as implausible if the new check sum calculated for the third discrete subarea is different from the stored check sum for the third discrete subarea.

3. A system for providing data protection to a plurality of fixed control parameters and a plurality of learned variables of at least a first program-controlled computer and a second program-controlled computer, comprising:

an arrangement for subdividing a parameter storage area of an EEPROM into three discrete subareas;

an arrangement for assigning one of the three discrete subareas to the first program-controlled computer;

an arrangement for assigning another one of the three discrete subareas to the second program-controlled computers; and an arrangement for storing the plurality of fixed control parameters and the plurality of learned variables in the parameter storage area, the arrangement for storing including:

an arrangement for storing in a first discrete subarea of the three discrete subareas each one of the plurality of fixed control parameters accessible to both the first program-controlled computer and the second program-controlled computer, without storing complements of the plurality of fixed control parameters stored in the first discrete subarea, an arrangement for storing in the first discrete subarea a check sum for the plurality of fixed control parameters stored in the first discrete subarea, an arrangement for storing in a second discrete subarea of the three discrete subareas accessible only to the first program-controlled computer each one of the plurality of learned variables corresponding to the first program-controlled computer, without storing complements of the plurality of learned variables stored in the second discrete subarea, an arrangement for storing in the second discrete subarea a check sum for the plurality of learned variables stored in the second discrete subarea, an arrangement for storing in a third discrete subarea of the three discrete subareas accessible only to the second program-controlled computer each one of the plurality of learned variables corresponding to the second program-controlled computer, without storing complements of the plurality of learned variables stored in the third discrete subarea, and an arrangement for storing in the third discrete subarea a check sum for the plurality of learned variables stored in the third discrete subarea.

4. A method for providing data protection to a plurality of fixed control parameters and a plurality of learned variables of at least a first program-controlled computer and a second program-controlled computer, comprising the steps of:

subdividing a parameter storage area of an EEPROM into three discrete subareas;

assigning one of the three discrete subareas to the first program-controlled computer;

assigning another one of the three discrete subareas to the second program-controlled computer;

storing the plurality of fixed control parameters and the plurality of learned variables in the parameter storage area by performing the steps of:

storing in a first discrete subarea of the three discrete subareas each one of the plurality of fixed control parameters accessible to both the first program-controlled computer and the second program-controlled computer, without storing complements of the plurality of fixed control parameters stored in the first discrete subarea, storing in the first discrete subarea a check sum for the plurality of fixed control parameters stored in the first discrete subarea, storing in a second discrete subarea of the three discrete subareas accessible only to the first program-controlled computer each one of the plurality of learned variables corresponding to the first program-controlled computer, without storing complements of the plurality of learned variables stored in the second discrete subarea, storing in the second discrete subarea a check sum for the plurality of learned variables stored in the second discrete subarea, storing in a third discrete subarea of the three discrete subareas accessible only to the second program-controlled computer each one of the plurality of learned variables corresponding to the second program-controlled computer, without storing complements of the plurality of learned variables stored in the third discrete subarea, and storing in the third discrete subarea a check sum for the plurality of learned variables stored in the third discrete subarea;

calculating a new check sum for the plurality of fixed control parameters stored in the first discrete subarea;

calculating a new check sum for the plurality of learned variables stored in the second discrete subarea;

calculating a new check sum for the plurality of learned variables stored in the third-discrete subarea;

comparing the new check sum calculated for the first discrete subarea to the stored check sum for the first discrete subarea;

designating the EEPROM as defective if the new check sum calculated for the first discrete subarea is different from the stored check sum for the first discrete subarea;

comparing the new check sum calculated for the second discrete subarea to the stored check sum for the second discrete subarea;

designating the plurality of learned variables stored in the second discrete subarea as implausible if the new check sum calculated for the second discrete subarea is different from the stored check sum for the second discrete subarea;

comparing the new check sum calculated for the third discrete subarea to the stored check sum for the third discrete subarea;

designating the plurality of learned variables stored in the third discrete subarea as implausible if the new check sum calculated for the third discrete subarea is different from the stored check sum for the third discrete subarea monitoring the plurality of learned variables stored in the second discrete subarea with respect to permissible values;

designating the plurality of learned variables stored in the second discrete subarea as implausible if an appropriate limit value is exceeded;

monitoring the plurality of learned variables stored in the third discrete subarea with respect to the permissible values; and designating the plurality of learned variables stored in the third discrete subarea as implausible if the appropriate limit value is exceeded.

5. A method for providing data protection to a plurality of fixed control parameters and a plurality of learned variables of at least a first program-controlled computer and a second program-controlled computer, comprising the steps of:

subdividing a parameter storage area of an EEPROM into three discrete subareas;

assigning one of the three discrete subareas to the first program-controlled computer;

assigning another one of the three discrete subareas to the second program-controlled computer;

storing the plurality of fixed control parameters and the plurality of learned variables in the parameter storage area by performing the steps of:

storing in a first discrete subarea of the three discrete subareas each one of the plurality of fixed control parameters accessible to both the first program-controlled computer and the second program-controlled computer, without storing complements of the plurality of fixed control parameters stored in the first discrete subarea, storing in the first discrete subarea a check sum for the plurality of fixed control parameters stored in the first discrete subarea, storing in a second discrete subarea of the three discrete subareas accessible only to the first program-controlled computer each one of the plurality of learned variables corresponding to the first program-controlled computer, without storing complements of the plurality of learned variables stored in the second discrete subarea, storing in the second discrete subarea a check sum for the plurality of learned variables stored in the second discrete subarea, storing in a third discrete subarea of the three discrete subareas accessible only to the second program-controlled computer each one of the plurality of learned variables corresponding to the second program-controlled computer, without storing complements of the plurality of learned variables stored in the third discrete subarea, and storing in the third discrete subarea a check sum for the plurality of learned variables stored in the third discrete subarea;

calculating a new check sum for the plurality of fixed control parameters stored in the first discrete subarea;

calculating a new check sum for the plurality of learned variables stored in the second discrete subarea;

calculating a new check sum for the plurality of learned variables stored in the third discrete subarea;

comparing the new check sum calculated for the first discrete subarea to the stored check sum for the first discrete subarea;

designating the EEPROM as defective if the new check sum calculated for the first discrete subarea is different from the stored check sum for the first discrete subarea;

comparing the new check sum calculated for the second discrete subarea to the stored check sum for the second discrete subarea;

designating the plurality of learned variables stored in the second discrete subarea as implausible if the new check sum calculated for the second discrete subarea is different from the stored check sum for the second discrete subarea;

comparing the new check sum calculated for the third discrete subarea to the stored check sum for the third discrete subarea;

designating the plurality of learned variables stored in the third discrete subarea as implausible if the new check sum calculated for the third discrete subarea is different from the stored check sum for the third discrete subarea monitoring the plurality of learned variables stored in the second discrete subarea with respect to permissible values;

designating the plurality of learned variables stored in the second discrete subarea as implausible if an appropriate limit value is exceeded;

monitoring the plurality of learned variables stored in the third discrete subarea with respect to the permissible values;

designating the plurality of learned variables stored in the third discrete subarea as implausible if the appropriate limit value is exceeded;

performing a data correction for each one of the plurality of learned variables stored in the second discrete subarea and the plurality of learned variables stored in the third discrete subarea determined as implausible;

comparing the plurality of learned variables stored in the second discrete subarea with the associated check sum for the second discrete subarea;

assigning the second discrete subarea to the first program-controlled computer;

comparing the plurality of learned variables stored in the third discrete subarea with the associated check sum for the third discrete subarea;

assigning the third discrete subarea to the second program-controlled computer;

designating the plurality of learned variables stored in the second discrete subarea as valid if the plurality of learned variables stored in the second discrete subarea and the associated check sum for the second discrete subarea are correct and identical;

designating the plurality of learned variables stored in the third discrete subarea as valid if the plurality of learned variables stored in the third discrete subarea and the associated check sum for the third discrete subarea are correct and identical;

if the plurality of learned variables and the associated check sum for the first program-controlled computer and the plurality of learned variables and the associated check sum for the second program-controlled computer are correct but different, programming a data and the check sum for the second program-controlled computer using a data and the check sum for the first program-controlled computer to establish a complete redundancy;

if the plurality of learned variables and the check sum for the first program-controlled computer are implausible, programming the data and the check sum for the first program-controlled computer using the data and the check sum for the second program-controlled computer to reestablish the complete redundancy;

if the plurality of learned variables and the check sum for the second program-controlled computer are implausible, programming the data and the check sum for the second program-controlled computer using the data and the check sum for the first program-controlled computer to reestablish the complete redundancy; and if the plurality of learned variables and the check sum for the first program-controlled computer and the plurality of learned variables and the check sum for the second program-controlled computer are implausible, accepting default values and designating the EEPROM as defective.

6. A system for providing data protection to a plurality of fixed control parameters and a plurality of learned variables of at least a first program-controlled computer and a second program-controlled computer, comprising:

an arrangement for subdividing a parameter storage area of an EEPROM into three discrete subareas;

an arrangement for assigning one of the three discrete subareas to the first program-controlled computer;

an arrangement for assigning another one of the three discrete subareas to the second program-controlled computers; and an arrangement for storing the plurality of fixed control parameters and the plurality of learned variables in the parameter storage area, the arrangement for storing including:

an arrangement for storing in a first discrete subarea of the three discrete subareas each one of the plurality of fixed control parameters accessible to both the first program-controlled computer and the second program-controlled computer, without storing complements of the plurality of fixed control parameters stored in the first discrete subarea, an arrangement for storing in the first discrete subarea a check sum for the plurality of fixed control parameters stored in the first discrete subarea, an arrangement for storing in a second discrete subarea of the three discrete subareas accessible only to the first program-controlled computer each one of the plurality of learned variables corresponding to the first program-controlled computer, without storing complements of the plurality of learned variables stored in the second discrete subarea, an arrangement for storing in the second discrete subarea a check sum for the plurality of learned variables stored in the second discrete subarea, an arrangement for storing in a third discrete subarea of the three discrete subareas accessible only to the second program-controlled computer each one of the plurality of learned variables corresponding to the second program-controlled computer, without storing complements of the plurality of learned variables stored in the third discrete subarea, and an arrangement for storing in the third discrete subarea a check sum for the plurality of learned variables stored in the third discrete subarea;

wherein each one of the first program-controlled computer and the second program-controlled computer includes:

a monitoring arrangement, wherein the monitoring arrangement includes:

an arrangement for calculating a new check sum for the plurality of fixed control parameters stored in the first discrete subarea, an arrangement for calculating a new check sum for the plurality of learned variables stored in the second discrete subarea, an arrangement for calculating a new check sum for the plurality of learned variables stored in the third discrete subarea, and an arrangement for comparing each of the new check sums with the corresponding check sum stored in the respective one of the first discrete subarea, the second discrete subarea, and the third discrete subarea, and a first decision arrangement, wherein the first decision arrangement includes;

an arrangement for designating the EEPROM as defective if the check sum calculated for the first discrete subarea is different from the stored running digital sum for the first discrete subarea, an arrangement for designating the plurality of learned variables stored in the second discrete subarea as implausible if the new check sum calculated for the second discrete subarea is different from the stored check sum for the second discrete subarea, and an arrangement for designating the plurality of learned variables stored in the third discrete subarea as implausible if the new check sum calculated for the third discrete subarea is different from the stored check sum for the third discrete subarea.

* * * * *

UNITED STATES PATENT AND TRADEMARK OFFICE
CERTIFICATE OF CORRECTION

PATENT NO.     : 6,510,527 B1
DATED          : January 21, 2003
INVENTOR(S)    : Dieter Woerner et al.

It is certified that error appears in the above-identified patent and that said Letters Patent is hereby corrected as shown below:

Column 3,
Line 30, change "microcontroller 1 ($\mu$C2)" to -- microcontroller 2($\mu$C2) --

Signed and Sealed this

Fourth Day of November, 2003

JAMES E. ROGAN
*Director of the United States Patent and Trademark Office*